BEST AVAILABLE COPY

J. C. WANDS.
Car-Roof.

No. 7,998. Reissued Dec. 18, 1877.

ATTEST:

Frank S. Boyd

Paul Bakewell

INVENTOR:

John C. Wands by Chas. D. Moody atty.

N. PETERS, PHOTO-LITHOGRAPHER, WASHINGTON, D. C.

UNITED STATES PATENT OFFICE.

JOHN C. WANDS, OF NASHVILLE, TENNESSEE.

IMPROVEMENT IN CAR-ROOFS.

Specification forming part of Letters Patent No. 136,569, dated March 4, 1873; Reissue No. 5,515, dated July 29, 1873; Reissue No. 7,998, dated December 18, 1877; application filed October 9, 1877.

*To all whom it may concern:*

Be it known that I, JOHN C. WANDS, of Nashville, in the county of Davidson and State of Tennessee, have invented a new and useful Improvement in Car-Roofs, of which the following is a full, clear, and exact description, reference being had to the annexed drawing, making a part of this specification, in which—

Figure 1:
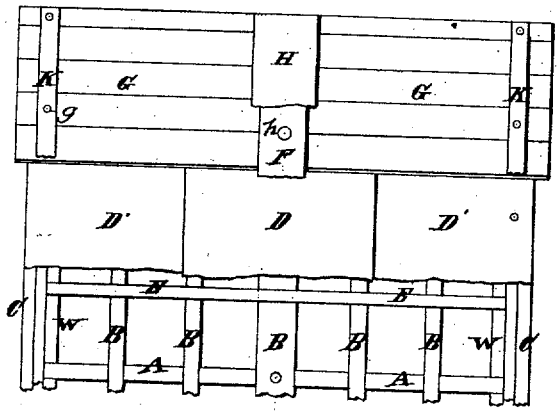
Figure 2:
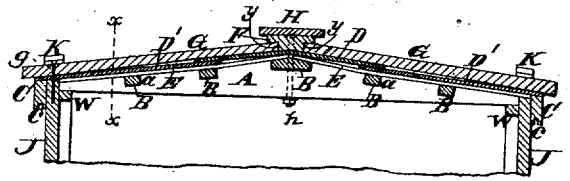
Figure 3:
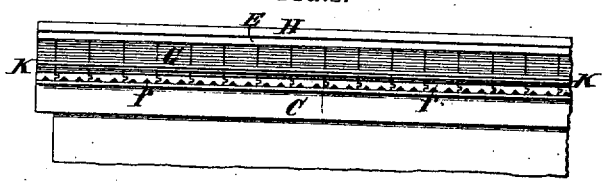
Figure 4:
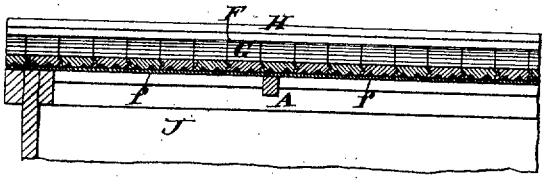
Figure 5:
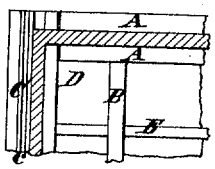

Figure 1 is a plan, partly broken away, of a car-roof containing the present improvement; Fig. 2, a transverse vertical section; Fig. 3, a side elevation of a portion of the roof; Fig. 4, a longitudinal vertical section, and Fig. 5 a detail.

Similar letters refer to similar parts.

By means of the present improvement a light, strong, durable car-roof is obtained.

Referring to the drawings, A A represent the rafters of the roof. They extend across the car, resting in or upon the wall-plates W W, and they are constructed to sustain an angular roof, and for that purpose are made with angular upper surfaces, as shown. They are also mortised or grooved at *a a*, to receive the purlins B B B, which extend from end to end of the car, resting in the rafters, as shown. C C represent the frieze-boards. They are fastened to the rafters A A at each end of the car, for which purpose the end rafters are made longer than the others. The sides J J of the car are secured between the wall-plates W W and the frieze-boards C C, and the ends of the car are held between two rafters that at each end of the roof are arranged just far enough apart to receive the tops of the end walls. A groove, *c*, is formed in the lower edge of the frieze-boards C C, to provide for diverting from the sides of the car the water that falls from the roof. The frieze-boards C C, the side walls J J, and the wall-plates are suitably fastened together, and preferably by means of screws, as the latter serve to render the united parts readily detachable. E E represent bands of iron stretched across the purlins B B, and secured to the wall-plate W W. They serve, with the purlins, to support the metallic sheets hereinafter described. D D D represent a layer or covering of metallic sheets, preferably zinc. This covering is formed of three sheets, extending longitudinally with the car and upon the frame above described; or, if preferred, they may be placed upon a lining of boards. Each of these sheets is of a width corresponding to a little more than a third part of the width of the roof, to provide for the lap and projection hereinafter mentioned. The central sheet D is bent over the crown of the roof upon the wide and beveled central purlin B, and laps over upon each of the sheets D′ D′, as shown in Fig. 1. The last-named sheets, in turn, and respectively, project a short distance beyond the frieze-boards, to form eaves for the roof. The ends of these sheets D D′ D′ are secured by bands or locks, such as are ordinarily used in the manufacture of tin or zinc ware. F represents what I call the "central top purlin." Its bottom is grooved or beveled, to fit the crown of the central sheet D, and it has on each side a groove or rabbet, *y y*, adapted to receive the upper ends of the roof-boards.

It will be seen that this last-named purlin is adapted for use either upon a metal or wooden roof.

By means of bolts or screws *h h* the purlins F and B are fastened together, clamping and fastening the intermediate boards G G and sheet D. By this means, also, the purlin F is made removable. H represents the running-board, for the use of brakemen. It is suitably fastened to the purlin F, and preferably by screws. G G represent the roof-boards, preferably tongued and grooved together. Their upper ends are secured in the side grooves *y y* of the purlin F, while their lower ends are secured to the frieze-boards C C by screws or nails *g g*, which also serve to hold in position the longitudinal bands *k k*. Grooves *f f* are formed in the under side of boards G G, respectively, extending from end to end. They serve to carry off any water that may reach the metal covering through the joints of the boards.

The bands E and K may sometimes be dispensed with.

I am aware that sheets of zinc have been used in the construction of car-roofs upon wooden frames. I do not therefore claim the use thereof, broadly.

I am also aware that in house-roofs a central rectangular beam without flanges has been used, against which the upper ends of the roof-boards abut on each side, and that a cap has been placed upon said beam, and held in place and made removable by means of hooks and staples. I lay no claim to the invention of such beam or cap; but

I claim—

1. The car-roof herein described, having the frame consisting of the parts A B C W, the bands E and K, the sheets D D′, and the grooved roof-boards G G, substantially as described.

2. The combination of the purlin F, roof-boards G G, and frieze-boards C C, constructed and arranged in a car-roof, substantially as described.

3. The combination, in a car-roof, of a layer of flat metallic sheets and an upper layer of boards, grooved on their under side, the boards resting directly upon the sheets, substantially as described.

4. The combination, in a car-roof, of a layer of metallic sheets bearing directly upon the car-roof frame, and an upper layer of boards bearing directly upon the sheets, substantially as described.

5. A car-roof composed of a lower layer of metallic sheets and an upper layer of boards, the sheets resting upon the car-roof frame beneath, and the boards being confined at their lower ends to the car-roof frame, and bearing immediately upon the sheets, serving or aiding to hold the latter down upon the car-frame, substantially as described.

6. In a car-roof, the combination of the longitudinal strips K K, the boards G G, the sheets D′ D′, and the car-frame, substantially as described.

7. The combination, in a car-roof, of the central purlin B, a metallic sheet, D, the boards G G, and the upper ridge-piece F, the parts B and F being drawn together by suitable bolts, for the purpose of clamping and fastening the intermediate sheet and boards, substantially as described.

JOHN C. WANDS.

Witnesses:
A. R. BROWN,
G. W. DONIGAN.